No. 725,811. PATENTED APR. 21, 1903.
N. ASBELL.
CANE CUTTING KNIFE AND STRIPPER.
APPLICATION FILED JAN. 15, 1903.
NO MODEL.
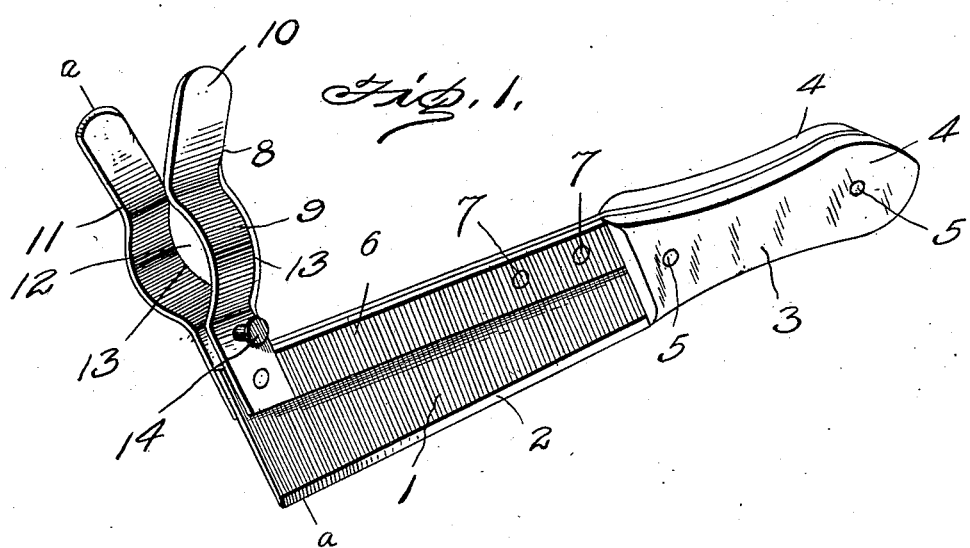
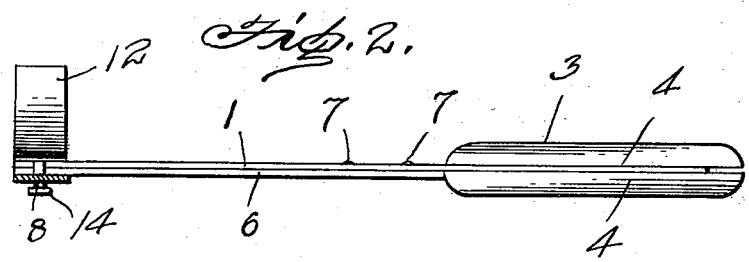
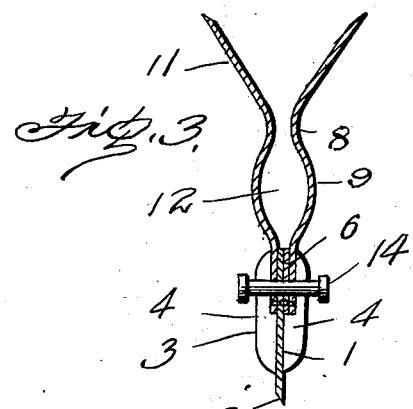
Witnesses
Jas Koehl.
Wilbur S. Hamer
Inventor
Noah Asbell.
By H. B. Willson & Co
Attorneys

UNITED STATES PATENT OFFICE.

NOAH ASBELL, OF OCHLOCHNEE, GEORGIA.

CANE CUTTING KNIFE AND STRIPPER.

SPECIFICATION forming part of Letters Patent No. 725,811, dated April 21, 1903.

Application filed January 15, 1903. Serial No. 139,175. (No model.)

*To all whom it may concern:*

Be it known that I, NOAH ASBELL, a citizen of the United States, residing at Ochlochnee, in the county of Thomas and State of Georgia, have invented certain new and useful Improvements in Cane Cutting Knives and Strippers; and I do declare the following to be a full, clear, and exact description of the invention, such as will enable others skilled in the art to which it appertains to make and use the same.

My invention is an improved combined cutting-knife and stripper; and it consists in the peculiar construction and combination of devices hereinafter fully described and claimed.

The object of my invention is to provide an improved implement of this character which is adapted to be used both for the purposes of stripping and cutting cane and is also adapted to be used for stripping prostrate cane.

In the accompanying drawings, Figure 1 is a perspective view of my improved cane cutter and stripper. Fig. 2 is a top edge view of the same, partly in section. Fig. 3 is a detail sectional view of the same, taken on the plane indicated by the line *a a* of Fig. 1.

In the embodiment of my invention I provide a cane-cutting knife or blade 1 of suitable size and shape, having a cutting edge 2 at one side and provided at its inner end with a handle 3. The handle is here shown as comprising a pair of pieces 4, placed on opposite sides of the inner end of the knife and secured thereto, as by rivets 5. On one side of the blade 1, at the back edge thereof, is a longitudinally-disposed spring-plate 6, the inner end of which is secured to the knife-blade, as by rivets 7. At the outer end of the said spring-plate 6 is a spring stripping-blade 8, which is disposed somewhat obliquely with reference to the spring-plate 6 and extends rearwardly from the outer end of the knife-blade 1. This spring stripping-blade 8 has its central portion bowed, as at 9, and its upper or outer portion inclined outwardly, as at 10. On the opposite side of the knife-blade 1 from the spring-plate 6 and stripping-blade 9, at the outer end and rear corner of said knife-blade, is a spring stripping-blade 11, which is practically identical in size, shape, and construction with the stripping-blade 8 and is reversely disposed with reference thereto, so that an eye 12 is formed between and by the said stripping-blades, and the outwardly-inclined outer end portions of the stripping-blades direct the cane-stalk into the said eye when the implement is appropriately wielded for stripping. The said stripping-blades have their eye portions or bowed portion sharpened on their inner edges, as at 13, to enable them to readily strip the cane.

It will be understood that the spring-plate 6 enables the spring stripping-blades to move toward and from each other, as may be required by the varying sizes of the cane on which the implement is employed. To prevent the said stripping-blades from springing too far apart, I provide a link-pin 14, which connects them together near their inner ends at a point immediately in rear of the knife 1, the said link-pin being loosely fitted in openings with which the said stripping-blades are provided and being provided with heads or other suitable stops which coact with said stripping-blades to limit their movement from each other.

The length of the cutting-blade 1 is such that the stripping-blades are at a suitable distance from the handle to enable the implement to be effectually used for stripping purposes as well as for cutting and topping purposes, and the oblique disposition of the stripping-blades with reference to the cutting-blade is such as to greatly facilitate the use of the implement in stripping prostrate canes. Hence my improved implement may be used for cutting, topping, and stripping cane whether the same be upright or prostrate.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus fully described my invention, what I claim as new, and desire to secure by Letters Patent, is—

1. A combined cutting and stripping instrument comprising a blade, and yieldable inspringing stripping-blades at the outer end thereof projecting rearwardly therefrom, substantially as described.

2. A combined cane cutting and stripping implement, comprising a blade having a stripping-blade projecting rearwardly therefrom, and a spring-plate on one side of said first-mentioned blade and provided with a stripping-blade disposed opposite and adapted to coact with the first-mentioned stripping-blade, substantially as described.

3. In combination with a cutting-blade and inspringing stripping-blades carried thereby, means to limit the movement of said stripping-blades from each other, substantially as described.

In testimony whereof I have hereunto set my hand in presence of two subscribing witnesses.

NOAH X ASBELL.
his    mark

Witnesses:
  ROSCOE LEEKE,
  JNO. W. H. MITCHELL.